(12) United States Patent
Ruotsalainen

(10) Patent No.: US 6,802,929 B2
(45) Date of Patent: Oct. 12, 2004

(54) PROCESS FOR TRANSMISSION LASER WELDING OF PLASTIC PARTS

(75) Inventor: Sami Ruotsalainen, Luxembourg (LU)

(73) Assignee: Delphi Technologies, Inc., Troy, MI (US)

( * ) Notice: Subject to any disclaimer, the term of this patent is extended or adjusted under 35 U.S.C. 154(b) by 218 days.

(21) Appl. No.: 10/152,493

(22) Filed: May 21, 2002

(65) Prior Publication Data

US 2002/0179233 A1 Dec. 5, 2002

(30) Foreign Application Priority Data

May 29, 2001 (LU) .................................................. 90784

(51) Int. Cl.$^7$ .............................................. B32B 31/24
(52) U.S. Cl. ...................... 156/272.8; 156/293; 156/294
(58) Field of Search ............................... 156/272.8, 293, 156/294; 174/17 R, 50, 50.5, 50.51, 50.57, 50.58; 403/270

(56) References Cited

U.S. PATENT DOCUMENTS

| | | | |
|---|---|---|---|
| 3,514,299 A | 5/1970 | Thanhauser | 99/171 |
| 3,769,117 A | * 10/1973 | Bowen et al. | 156/69 |
| 4,477,010 A | 10/1984 | Dufft | 228/138 |
| 5,626,776 A | 5/1997 | Morris, Jr. | 219/121.64 |
| 5,893,959 A | 4/1999 | Muellich | 156/272.8 |
| 6,589,380 B2 | 7/2003 | Gnage et al. | |
| 6,596,122 B1 | * 7/2003 | Savitski et al. | 156/304.2 |
| 2002/0115963 A1 | * 8/2002 | Clarke et al. | 604/103 |

FOREIGN PATENT DOCUMENTS

| | | |
|---|---|---|
| DE | 4432081 | 3/1996 |
| FR | 2165906 | 8/1973 |
| FR | 2656824 | 7/1991 |

OTHER PUBLICATIONS

Colvin, R., "Lasers put new light on vibration–free welding," Modern Plastics International, McGraw–Hill, Inc. Lausanne, CH, vol. 28, No. 11, Nov. 1998, pp. 75–77.

* cited by examiner

*Primary Examiner*—Jeff H. Aftergut
*Assistant Examiner*—John T. Haran
(74) *Attorney, Agent, or Firm*—Jimmy L. Funke

(57) ABSTRACT

A process for transmission laser welding of a first plastic part and a second plastic part that can be at least partially received in the first plastic part is proposed. The second plastic part is introduced into the first plastic part, to which it is connected by means of an interference fit connection, whereby at least one contact zone between the second plastic part and the first plastic part is formed as a result of this interference fit. A laser beam is directed to impinge on the second plastic part, through the first plastic part, along the at least one contact zone to form a weld.

1 Claim, 1 Drawing Sheet

PROCESS FOR TRANSMISSION LASER WELDING OF PLASTIC PARTS

FIELD OF THE INVENTION

The present invention generally relates to a process for transmission laser welding of plastic parts.

BACKGROUND OF THE INVENTION

Electrical devices often comprise a plastic housing, in which the electrical components are accommodated. Such housings are generally made of a plurality of plastic parts, which are put together during the assembly of the electrical device, and often a solid connection between the housing parts is desired.

In order to solidly connect these housing parts together, various techniques may be employed. For example, ultrasonic welding is a technique which allows to hermetically seal plastic housings. However, it is disadvantageous since solder connections on the electrical components and also the components themselves may be destroyed on account of the ultrasonic vibrations, ultimately making the electrical device unusable.

When the housing parts have a rotational symmetry, it is possible to use a friction welding process. This technique is however constraining, as the arrangement of the electrical components within the housing must be such as to avoid any rubbing of an electrical component against a moving housing part during the welding process. This means that some air gaps must be provided at some locations, which in some cases, depending on the type of electrical device, may be disadvantageous. For example, in the case of a magnetic sensing device, it is desirable that the magnetic sensor be in close contact with the housing wall for sensitivity reasons.

In U.S. Pat. No. 5,893,959 a method for sealing a housing of an electrical switch by means of transmission laser welding is described. The housing is composed of two housing parts such as a pot-shaped housing base and a housing cover. The housing base has an annularly surrounding shoulder on which the housing cover is placed, whereby a continuous annular joining zone exists between the housing base and the housing cover. The housing cover is essentially transparent for the spectrum of the laser source whereas the housing base is essentially absorbent for the spectrum of the laser source. In order to seal the housing, a laser beam is directed to impinge on the shoulder of the housing base, through the housing cover, along the annular joining zone to form a weld.

Such a method of transmission laser welding is not damaging to the electrical components and does not require a special arrangement of the components with regard to the housing parts. However, it shall be noted that the housing parts being welded must be in close contact with each other. Therefore, it is preferable to apply a pressure onto the joining zone, in particular for avoiding the formation of voids. As described in U.S. Pat. No. 5,893,959, it is possible to use clamping means which are transparent to the laser beams, with the result that the action of pressure can be brought to bear directly in the region of action of the laser beams. The use of such clamping means however complicates the welding process, as it must be installed and removed for each housing to be welded. Furthermore, the use of clamping means is particularly inconvenient when welding together parts having a non-planar geometry.

OBJECT OF THE INVENTION

The object of the invention is to provide a process of transmission laser welding of plastic parts, wherein a good quality weld can be achieved without clamping means, also with plastic parts having a non planar geometry. This is achieved by a process of transmission laser welding as claimed in claim 1.

SUMMARY OF THE INVENTION

According to the invention, a process of transmission laser welding is proposed, in which a first plastic part and a second plastic part that can be at least partially received in the first plastic part are welded together. It shall be appreciated that the first plastic part and the second plastic part are formed in such a way that upon introduction of the second plastic part into the first plastic part, they are connected by means of an interference fit. Accordingly, the first and second plastic parts are thus first connected by at least partially inserting the second plastic part into the first plastic part, whereby at least one contact zone between the second plastic part and the first plastic part is formed as a result of the interference fit. According to an important aspect of the invention, a laser beam is then directed to impinge on the second plastic part, through the first plastic part, along the at least one contact zone to form a weld.

A great advantage of the process of the invention is that at the contact zone pressure forces due to the interference fit exist, which cause an outer surface portion of the second plastic part and an inner surface portion of the first plastic part to be pressed against each other. Hence, an action of pressure exists directly in this inner contact zone where the welding is to be effected and there is no need for external clamping means for pressing the two plastic parts against each other during the welding process. Moreover, these pressure forces at the contact zone will generally increase during the welding, due to thermal expansion of the plastic materials. As a result, an intimate contact is ensured at the contact zone, during the whole welding process, thereby avoiding the formation of voids in the weld. It follows that high quality welds can be obtained, whereby the welds may also provide an airtight and watertight sealing. Besides, the present process allows to assemble and adjust the plastic parts in their final positions with precision, before the laser welding step. Indeed, the interference fit keeps the two plastic parts in place, without specific hold means. This obviously simplifies the welding process. Furthermore, in case the surfaces in the contact zone are not exactly complementary, as well as in case of burrs on these surfaces, the interference fit will tend to cause the plastic parts to adapt to the shapes of each other. This effect as well as plastic expansion at the weld allow to obtain a uniform weld.

The present method thus provides a process which allows to obtain good quality welds without clamping means. Further benefits of the present process are: (1) precise and contactless heat transmission with improved control of temperature in the heated zones; (2) high and economically interesting welding speeds; (3) possibility of welding parts with different stiffnesses and viscosities.

As the laser beam has to penetrate through the first plastic part to reach the contact zone and heat up the second plastic part, it is clear that the first plastic part should be more transmitting, respectively less absorbing, than the second plastic part for the spectrum of the laser beam, at least in the regions touched by the laser.

In a preferred embodiment, the first plastic part comprises a tubular shell and the second plastic part comprises an insert element that can be at least partially inserted into the tubular shell. Moreover, the insert element and the tubular shell are formed in such a way as to provide the interference fit connection, whereby the at least one contact zone is formed between the insert element and the tubular shell. Hence, the welding is carried out by directing the laser beam to impinge on the insert element, through the tubular shell, along the at least one contact zone.

In such a case, the interference fit connection may result from different types of shapes of the plastic parts. A first possibility is that the tubular shell has a circular cross-section and the insert element has a cylindrical outer shape with a diameter which is superior to the inner diameter of the tubular shell.

Another way of creating an interference fit is to provide an annular rib either on the outer surface of the insert element or on the inner surface of the tubular shell, the rib having a thickness such that it interferes with the other part. In such a case, the tubular shell preferably has a circular inner cross-section and the insert element has a cylindrical outer shape with a diameter inferior to the inner diameter of the tubular shell. The use of an annular rib either on the insert element or on the outer shell will provide a continuous annular contact zone between the two pieces.

It is to be noted that, although cylindrical shapes are preferred for sealing reasons, the interference fit may also be obtained with a variety of shapes. Moreover, it is clear that if no airtight and/or watertight sealing is to be carried out, the contact zone does not need to be continuous or the weld may be effected by sections.

The plastic material of the first and second plastic parts may be selected from a variety of thermoplastics. The transmission and absorption coefficients for the spectrum of the laser beam depend on the type of thermoplastic and on the additives, such as filling material and pigments, as well as on the wavelength and energy density of the laser beam. When using an Nd:YAG laser, the following thermoplastics are particularly suited: polyolefines, polyamides, polyformaldehyd, PMMA, PBT, PET.

Additives such as glass fibers and glass globes and other filling materials, increase the dispersion of the radiation and thereby decrease the penetration depth, but they do not completely hinder the penetration through the material, whereby such materials may be also be used for the transmitting part, i.e. the tubular shell, and not only for the absorbing insert element.

The laser beam may have a wavelength ranging from 0.50 to 10.90 $\mu$m, preferably between 800 and 1100 nm. Any laser source capable of heating thermoplastic materials may be employed, in particular lasers emitting in the infrared range. Lasers sources emitting in the short-wavelength infrared, such as e.g. a solid-state Nd:YAG laser ($\lambda \approx$1064 nm) or a laser diode ($\lambda \approx$800 to 1000 nm), are preferred for the welding of thermoplastic parts, but the $CO_2$ laser is also adapted for many applications. To minimise loss by reflection on the outer surface of the first plastic part, the incident laser beam should preferably be perpendicular to its outer surface.

The process of the invention can advantageously be implemented for welding a plastic housing of an electrical device, in which the housing comprises two plastic parts. The first plastic part may be an outer housing part comprising a cylindrical shell closed at one end. The second plastic part may be an inner housing part comprising a support element, in which electrical components are accommodated, and a cylindrical element. Preferably, the cylindrical element of the inner housing part has an outer diameter, which is inferior to the inner diameter of the cylindrical shell of the outer housing part. Moreover, this cylindrical element is provided with an annular, peripheral rib having an outer diameter, which is superior to the inner diameter of the cylindrical shell of the outer housing part, so as to interfere with the inner surface of this cylindrical shell upon introduction therein. The inner housing part is introduced into the cylindrical shell of the outer housing part in such a way that the support element with the electrical components are enclosed by the two housing parts, and that the peripheral rib is inside the outer housing part, next to the open end thereof. Due to the interference fit between the rib and the inner surface of the outer housing part, an annular contact zone is formed. The laser beam is then directed to impinge on the peripheral rib, through the cylindrical shell of the outer housing part, along the annular contact zone, to form an annular weld.

The interference fit between the two housing part produces radial pressure forces at the contact zone, which ensure an intimate contact between the two parts during the welding. No clamping means are required, and the two housing parts can be precisely assembled before the welding. The present process thus allows to rapidly and efficiently seal plastic housings by means of a laser. It is particularly well suited for welding plastic housing of sensors or actuators, e.g. a camshaft sensor or a fuel tank purge solenoid. It is to be noted that since the present method uses a laser beam, there are no problems of compatibility as with ultrasonic welding, and there is no need for air gaps as with friction welding. Moreover, when a continuous weld is effected, such as e.g. an annular weld all along the contact zone, a sealed connection is obtained, and there is no need for a further sealing means such as e.g. an O-ring.

According to a further aspect of the invention, a welded plastic part comprising a first and a second plastic part connected by means of an interference fit and welded together by means of transmission laser welding is proposed. The second plastic part is at least partially received in the first plastic part and at least one weld is located at a contact zone between an inner surface portion of the first plastic part and an outer surface portion of the second plastic part, the contact zone resulting from the interference fit. The second plastic part is more absorbing, respectively less transmitting, for the laser beam than the first plastic part in the vicinity of the contact zone.

BRIEF DESCRIPTION OF THE DRAWINGS

The present invention will now be described, by way of example, with reference to the accompanying drawing, in which.

DETAILED DESCRIPTION OF A PREFERRED EMBODIMENT

Figure 1:
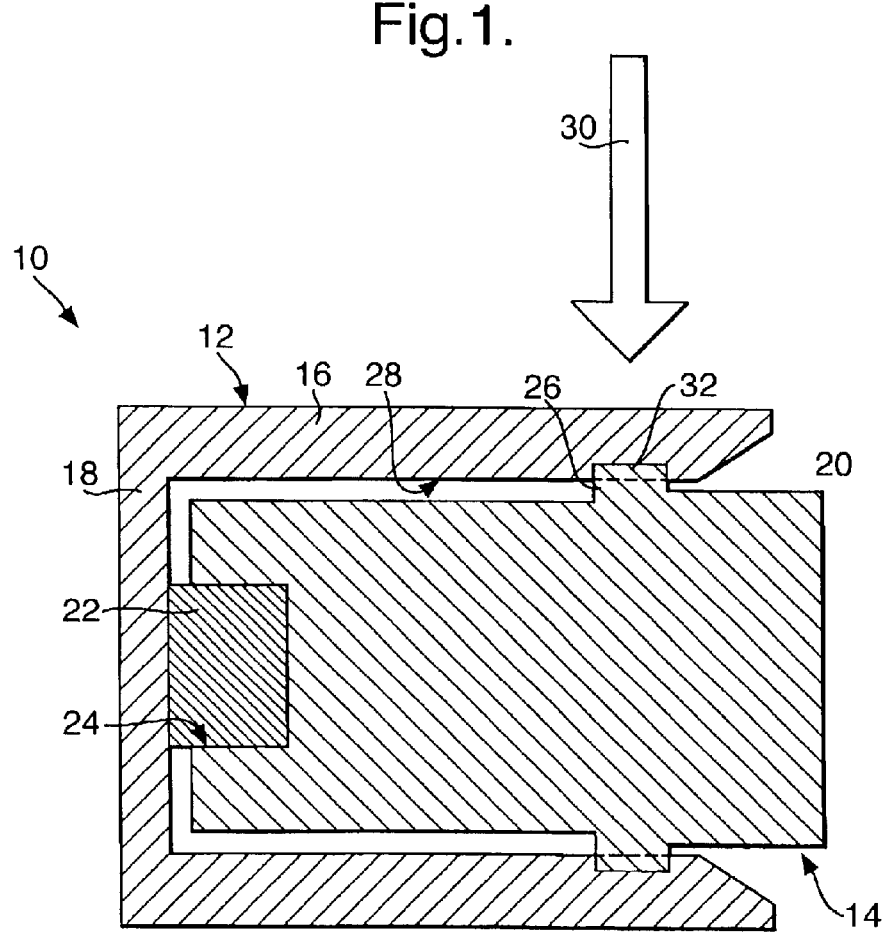
FIG. 1: is a sectional view of a camshaft sensor comprising a plastic housing.

FIG. 1 shows a sectional view of a camshaft sensor 10 with a plastic housing, which is composed of an outer housing part 12 and an inner housing part 14 made of a thermoplastic polymer, preferably including glass fibers. The outer housing part comprises a cylindrical shell 16 closed at one end by a flat bottom 18. The inner housing part 14 comprises a cylindrical element 20 which is partially received in the cylindrical shell 16 of the outer housing part 12. The outer diameter of the cylindrical element 20 is smaller than the inner diameter of the cylindrical shell 16. Reference sign 22 indicates a magnetic sensor, which is arranged in a recess 24 in the internal end of the cylindrical element 20. The magnetic sensor 22 is in abutment against the inner side of the flat bottom 18 of the outer part 12. Although not shown, electrical components are accommodated in the cylindrical element 20 of the inner housing part 14. Such a camshaft sensor 10 allows to detect the variation of magnetic field density caused e.g. by a metallic ferrous target either as a part of the camshaft itself or as a separate part rotating with the camshaft passing in front of the sensor in a bias magnetic field provided by a permanent magnet mounted inside the magnetic sensor 22.

It shall be noted that the housing of this camshaft sensor has been welded by means of transmission laser welding. This welding has been effected along a contact zone resulting from an interference fit connection provided between the inner housing part 14 and the outer housing part 12. In the present embodiment, the interference fit connection is formed by an annular peripheral rib 26 provided on the cylindrical element 20 of the inner housing part 14, which cooperates with the inner surface 28 of the cylindrical shell 16. Initially, i.e. before assembly and welding of the housing, the peripheral rib 26 has a thickness which is such that its outer diameter is slightly greater than the inner diameter of the shell 16.

A preferred process for welding such a camshaft sensor 10 will now be described herebelow. Starting from the two individual housing parts 12, 14, the first step is to assemble these inner 14 and outer 12 housing parts. The cylindrical element 20 of the inner housing part 14 is thus introduced into the cylindrical shell 16 of the outer housing part 12 in such a way that the magnetic sensor and the electronic or electrical components are enclosed by the two housing parts 12 and 14. In the present case, the two housing parts 12 and 14 are assembled in such a way that the magnetic sensor 22 is in contact with the bottom 18 of the outer housing part 12. As a matter of fact, the inner part 14 is more exactly pressed into the outer housing part 12, due to the interference fit connection. As a result of this assembly, an annular contact zone is formed between the annular rib 26 and an annular portion of the inner surface 28 of the cylindrical shell 16. At this moment, the two housing parts 12 and 14 are connected by means of the interference fit, which keeps the two housing parts in their relative positions.

It shall be appreciated that, in the next step, a laser beam, indicated by arrow 30, is directed to impinge on the annular rib 26, through the outer shell 16, in order to form a weld at the contact zone. Indeed, the laser beam 30 penetrates through the outer housing part 12, closest to the laser source, substantially unhindered and is largely absorbed by the rib 26 of the inner housing part 14, whereby a melting of the outer housing part 12 and of the rib 26 is achieved. In order to completely seal the housing, the assembly is rotated so that the laser beam 30 is directed to impinge along the whole annular contact zone, so that an annular joint is effected, which solidifies by cooling and forms an annular weld 32.

It will be understood that pressure forces exist at the contact zone, due to the interference fit, which permit an intimate contact between the rib 26 and the portion of the inner surface 28 of the outer shell 16 in contact with the rib 26. In the present embodiment, the interference fit provides enough radial pressure forces at the contact zone to avoid any voids in the weld 32, whereby a high quality weld is obtained. Hence, there is no need for clamping means to press the outer shell 16 onto the rib 26.

For improved welding conditions, at least in the regions touched by the laser, the outer housing part 12 should be largely transmitting for the laser beam, and the inner housing part 14 should be largely absorbent for the laser beam. For this purpose, the outer housing part 12 has a high transmission coefficient and a low absorption coefficient in comparison with the inner housing part 14, i.e. the outer housing part 12 has a greater transmission coefficient than the inner housing part 14 and the inner housing part 14 has a greater absorption coefficient than the outer housing part 12. Theses differences in transmission and absorption coefficient are conventionally obtained by varying the proportions of additives, such as e.g. fillers, pigments and glass fibers.

It is to be noted that with the present method there is no problem of compatibility with the electronic or electric components inside the housing. Moreover, contrary to e.g. friction welding processes, it is not necessary to provide an air gap between the electronic or electric components and the housing walls. It follows that the magnetic sensor 22 can be in contact with the bottom 18 of the outer housing part 12, whereby sensitivity loss due to secondary air gaps are avoided.

Furthermore, by moving the laser beam 30 along the whole annular contact zone, an annular weld 32 is effected, which provides an air- and watertight sealing of the housing. Therefore, the rib 26 should be next to the open end of the outer housing part 12.

What is claimed is:

1. A process for welding a plastic housing of an electrical device, comprising the steps of:

providing an outer housing part comprising a cylindrical shell closed at one end;

providing an inner housing part comprising a support element, in which electrical components are accommodated, and a cylindrical element having an outer diameter which is inferior to the inner diameter of said cylindrical shell of said outer housing part, said cylindrical element further comprising a peripheral rib having an outer diameter which is superior to the inner diameter of said cylindrical shell of said outer housing part;

introducing said inner housing part into said outer housing part in such a way that said support element with said electrical components are enclosed by the two housing parts, and that said peripheral, annular rib is inside the outer housing part, about the open end thereof, whereby an annular contact zone is formed between said rib and said cylindrical shell of said outer housing part; and directing a laser beam to impinge on said peripheral, annular rib, through said cylindrical shell of said outer housing part, along said at least one contact zone to form a weld.

* * * * *